(12) United States Patent
Sust

(10) Patent No.: US 10,580,318 B2
(45) Date of Patent: Mar. 3, 2020

(54) SYSTEM AND METHOD FOR BIMANUAL TRAINING

(71) Applicant: Peter H. Sust, Stockton, CA (US)

(72) Inventor: Peter H. Sust, Stockton, CA (US)

( * ) Notice: Subject to any disclaimer, the term of this patent is extended or adjusted under 35 U.S.C. 154(b) by 89 days.

(21) Appl. No.: 15/859,501

(22) Filed: Dec. 30, 2017

(65) Prior Publication Data

US 2019/0206275 A1   Jul. 4, 2019

(51) Int. Cl.
*G09B 11/04*   (2006.01)
*G09B 5/02*    (2006.01)

(52) U.S. Cl.
CPC ............... *G09B 11/04* (2013.01); *G09B 5/02* (2013.01)

(58) Field of Classification Search
CPC ..................... G09B 11/04; A63B 2022/0041
See application file for complete search history.

(56) References Cited

U.S. PATENT DOCUMENTS

| 2,456,632 | A | * | 12/1948 | Greenberg | G09B 11/04 33/23.11 |
| 3,528,183 | A | * | 9/1970 | Lucero | G09B 11/04 434/164 |
| 3,731,402 | A | * | 5/1973 | Paul | G09B 11/04 434/164 |
| 4,669,986 | A | * | 6/1987 | Yokoyama | G09B 11/04 434/164 |
| 2015/0302757 | A1 | * | 10/2015 | Bansal | G09B 11/04 434/164 |

* cited by examiner

*Primary Examiner* — Daniel Swerdlow
(74) *Attorney, Agent, or Firm* — Ariel S. Bentolila; Bay Area IP Group, LLC

(57) ABSTRACT

A system including a first substrate implement with a first side, a first groove contrivance machined, molded or casted into the first side, and in which the first groove contrivance comprises a first predetermined pattern and a predetermined size. A first tracing tool includes a first end portion, in which said first end portion comprises a tip with a first predetermined diameter size and shape, wherein the first predetermined diameter size and shape is configured to correspond to the first predetermined size of the first groove contrivance. The tip of the first end portion is operable for tracing the first groove contrivance.

20 Claims, 9 Drawing Sheets

SYSTEM AND METHOD FOR BIMANUAL TRAINING

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to guiding tools. More particularly, certain embodiments of the invention relate to guiding tools or apparatus for creating and improving bimanual independence and/or co-ordination.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Various attempts are being made in the art that relate to device or apparatus for aiding in upper extremity rehabilitation treatment. Additionally, there are numerous published studies regarding bimanual interference and the benefits of creating new neurological connections. Typically, these devices or apparatuses may be employed as rehabilitation devices or apparatuses to improve limb or body part dexterity in users who have suffered some accident resulting in some form of disability.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that the apparatus known in the art may include multiple parts and a user may require assistance to start using the apparatus. There may be an omnipresent danger of further complication as the apparatus may provide support for the patient to move the arm at different joints either by passive movement or active assist movement and the user may be controlled by the device.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
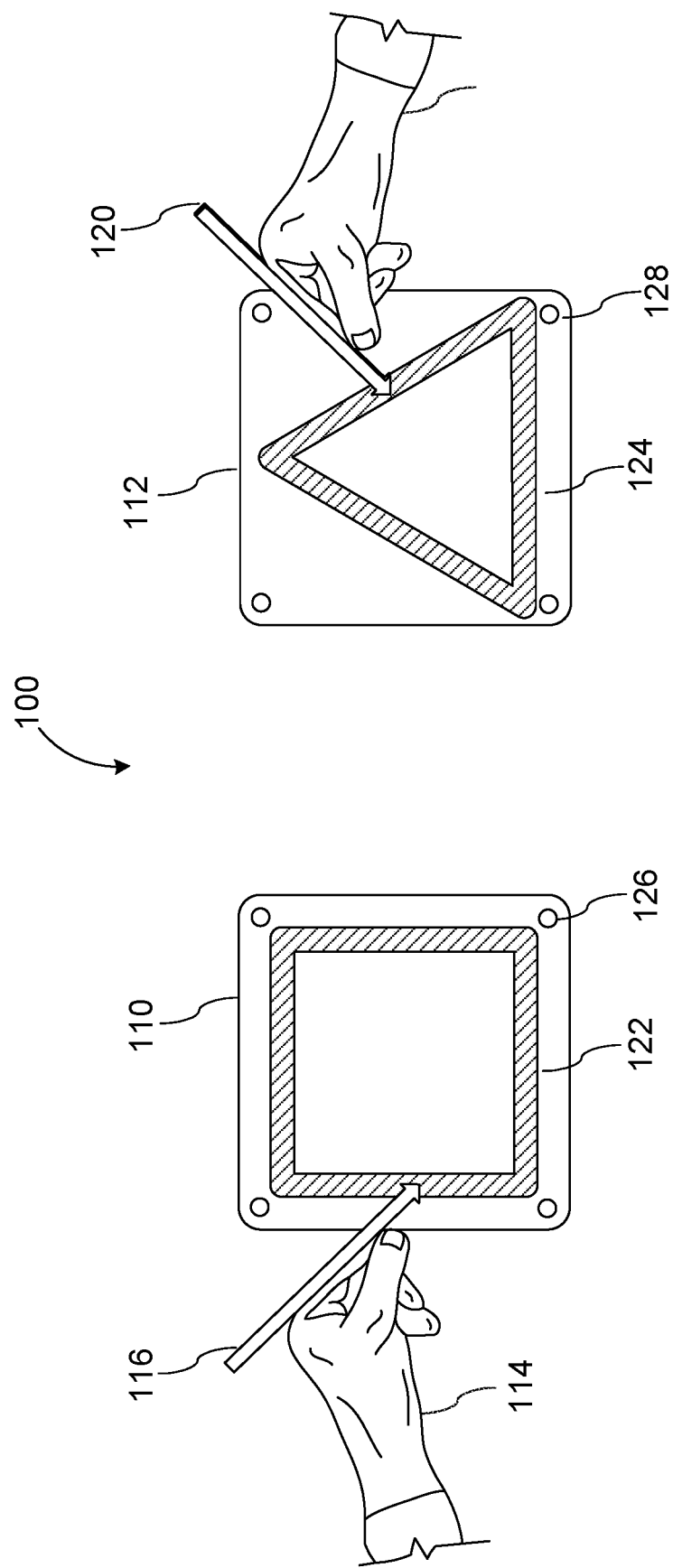
FIG. 1 illustrates an exemplary system including a guiding tool for creating and improving bimanual independence and coordination, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation.

Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., web site owners or operators) place multimedia information (e.g., text, graphics, audio, video, animation, and other forms of data) at specific locations on the Internet referred to as webpages. Websites comprise a collection of connected, or otherwise related, webpages. The combination of all the web sites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, freespace optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Fire Fox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Typically, bimanual interference is experienced while attempting to perform a task, which is an indication that the task requires the creating of new neurological connections in order to perform those tasks without interference. Therefore, if a person after using the tool/apparatus described herein is able to perform tasks that may generally not be possible with bimanual interference, then as a result of using the tool, the necessary and beneficial new/improved neurological connections needed to achieve bimanual independence may have been created.

In one embodiment, a guiding tool and/or apparatus for creating and improving bimanual independence and coordination in a user is provided. In one embodiment, the tool may include a physical tool. The physical tool may force a user through a concrete physical experience in order to create a memory that may help eliminate bimanual interference. This may enable the upper extremities of a user to independently perform tasks without interference. For example, the left hand of a user may perform a patting action while the right hand of a user may perform a rotational action, the left hand and a right hand of a user may perform different actions while playing an instrument, and the like. For musical conductors to be able to train one hand to move in a square pattern and at the same time move the other hand to move in a triangular pattern is very desirable while directing a choir. The earliest age that children may be able to attain a variety of dextral abilities that require new neurological connections to achieve bimanual independence, the easier it will be to attain other dextral abilities as they grow older.

In one embodiment, the tool physically and independently guides each upper extremity through specific paths that may be different. In one embodiment, the paths may be enabled to independently change direction of motion, and accordingly guide the upper extremities of the user to change direction of motion while following the specific paths.

In one embodiment, the tool may include a substrate, wherein a pattern may be traced in the substrate, for example, a shape block. In one embodiment, the substrate may include a plate like structure with pattern traced in. As mentioned hereinabove, the pattern traced in the substrate may guide or force a user to follow the pattern. A user may use tracking tools for following the patterns. In one embodiment, the tracking tool may include but not be limited to a pen-like tracking tool, a handgrip, and the like. In various embodiments, the tracking tool may be mechanically controlled or may be electronically controlled. In one embodiment, the pattern may be formed like a groove on a surface of the substrate. In the embodiment, where the pattern may be formed with a groove, the tracking tool may be designed to fit into the groove on the substrate. The user may use the tracking tool that fits into the groove on the substrate for the purpose of overcoming bimanual interference which may result in creating bimanual independence and coordination.

Additionally, in some embodiments, electronics may be employed to monitor and track motion, speed, pattern, etc. . . . , provide feedback regarding the performance of each of the user's arm irrespective of whether the user is using the pen-like stylus with transmitting capabilities, or using programmable robotic arms with hand-grips for the users hands to grab and simultaneously follow two predetermined but different patterns, or the user is using the manual version, with the ability to change direction of travel on command, etc. . . . . In certain embodiments, non-grooved patterns with boundaries may be employed for the users to follow, and if there is deviation, or if not followed properly, may result in audible, visual, electrical warning signal to the user.

Accordingly, in order to provide users of the tool/apparatus described herein a system to eliminate bimanual interference, the ability to track and assist the progress being made towards achieving bimanual independence by eliminating interference, some or all of the following available electronic devices may be combined or bundled, for example, touchpads with capacitive or conductive sensing capabilities, styluses with passive tip or active tip pen with electronic components that allows users to directly work onto the LCD screen surface of a computing device such as a smartphone, tablet computer screen, Ultrabook, laptop or desktop computer with various operating systems, that may provide feedback to the users the process used herein, allowing the users to monitor their progress as they use the teaching method using the tool/apparatus for overcoming bimanual interference and attain bimanual independence.

Referring to FIG. 1 is illustrated an exemplary system including a guiding tool for creating and improving bimanual independence and coordination, in accordance with an embodiment of the present invention. FIG. 1 includes a first substrate implement 110 and a second substrate implement 112. The substrates are machined, casted or molded defining different patterned grooves cut into a piece of material including, but not limited to, plastic, metal, wood, etc. The first substrate 110 includes a groove contrivance with a proximate square 122 pattern and the second substrate 112 includes a groove contrivance with a proximate triangle 124 pattern. In some embodiments, the pattern on the grooves may be different type of shapes and a width of the grooves may be sized differently. The substrates may be secured on 126 a surface on which they may be placed. In various embodiments, the substrates may be secured 126 using anti-skid pads, screws, nut-bolt arrangement, and the like. A user may then be provided with a tracing tool or instrument 116, 120. One end portion of the tracing tool may be sized and shaped to correspond to the size of the groove. The user may hold one tracing tool 116, 120 in each of the upper extremities, i.e., left hand 114, and right hand 118 respectively. The user may then trace the groove of the square pattern 122 with left hand 114 and the groove of the triangle pattern 124 with right hand 118. In one embodiment, the user may start tracing the groove of the first pattern with the hand that is not dominant and then start tracing the groove of the second pattern with the hand that is dominant. In another embodiment, the user may start tracing the groove of the first pattern with the hand that is dominant and then start tracing the groove of the second pattern with the hand that is non-dominant. In yet another embodiment the user may start tracing both the grooves of the first pattern the second pattern simultaneously. In certain embodiments, the user may start at a lower speed and gradually increase the speed. As discussed herein above, the user may eventually overcome bimanual interference which may result in creating bimanual independence and coordination for the user.

During typical operation of the system 100, a user may select two substrate implements, i.e., two plates with different patterns. In one embodiment, the two plates may be interlocked. In another embodiment the two plates may not be interlocked. The user may place the plates on a flat surface in front of the user, one to the user's left the other to the user's right. The user may then select two groove tracking tools one for each hand that corresponds with the groove design in the plates previously selected by the user. The user may then hold one tracking tool in each hand as one would hold a writing implement as shown in FIG. 1. The user may then place the tracking tool being held in the left hand anywhere into the groove path of the plate to the left in front of the user and place the tracking tool being held in the user's right hand anywhere into the groove path of the plate on the right in front of the user. In one exemplary embodiment, the user may then begin to follow the groove path of the plate with the non-dominant hand until the user feels comfortable. Once the user feels comfortable following the groove path of the plate with the non-dominant hand, the user may start following the groove path of the other plate with the dominant hand simultaneously. The user may continue to do this until the user is comfortable with using both hands simultaneously in the groove path of the plates. In one embodiment, the user may now be ready to try and change the direction in the groove path of the plate with the non-dominant hand until the user can change direction with either hand without feeling interference. It may be appreciated by a person with ordinary skill in the art, in light of and in accordance with the teachings of the present invention that, it may be easier to overcome a feeling of interference by initially following the groove path of the plates slowly and repetitively until new connections in the brain are established and the user starts feeling the results, i.e., decrease in bimanual interference. It may be appreciated by a person with ordinary skill in the art, in light of and in accordance with the teachings of the present invention that, it may take different lengths of time for different people to achieve the comfort of non-interference. In one embodiment, several short sessions spread over time may provide better results than the results obtained with one long session.

Figure 2:
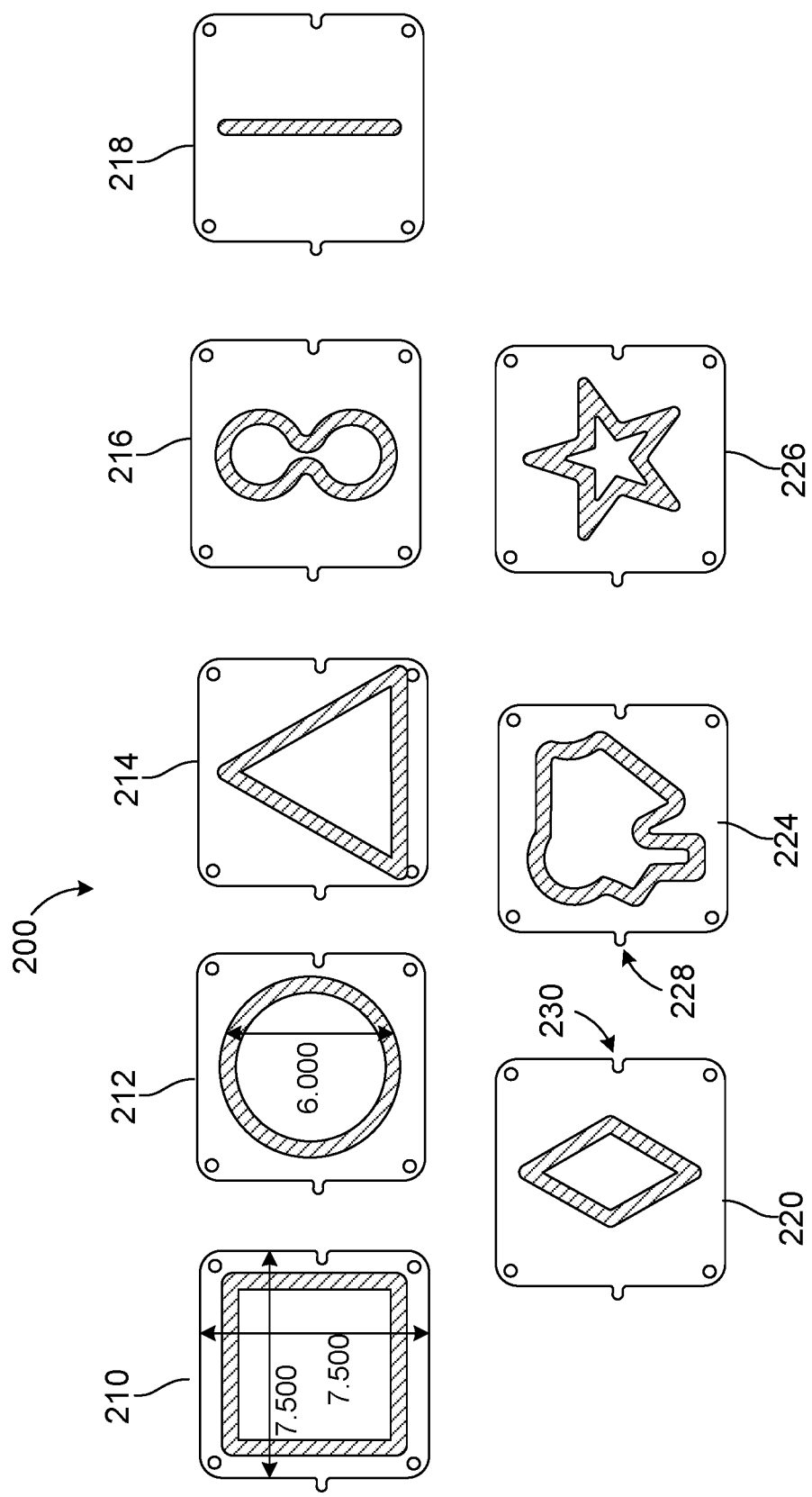
FIG. 2 illustrates an exemplary portion of a guiding tool for creating and improving bimanual independence and coordination, in accordance with an embodiment of the present invention.

Referring to FIG. 2 is illustrated an exemplary portion 200 of a guiding tool for creating and improving bimanual independence and coordination, in accordance with an embodiment of the present invention. As shown in FIG. 2, various groove patterns/shapes and groove width size and shape may be employed in the substrate implement, but not limited to, i.e., square 210, circle 212, triangle 214, eight shape 216, vertical line 218, diamond 220, random 224, star 226, etc. . . . . In one embodiment, the substrates may be interlocking. Each substrate may include notches 228 and 230. Two or more substrates may be interlocked using notches 228 and 230.

Figure 3:
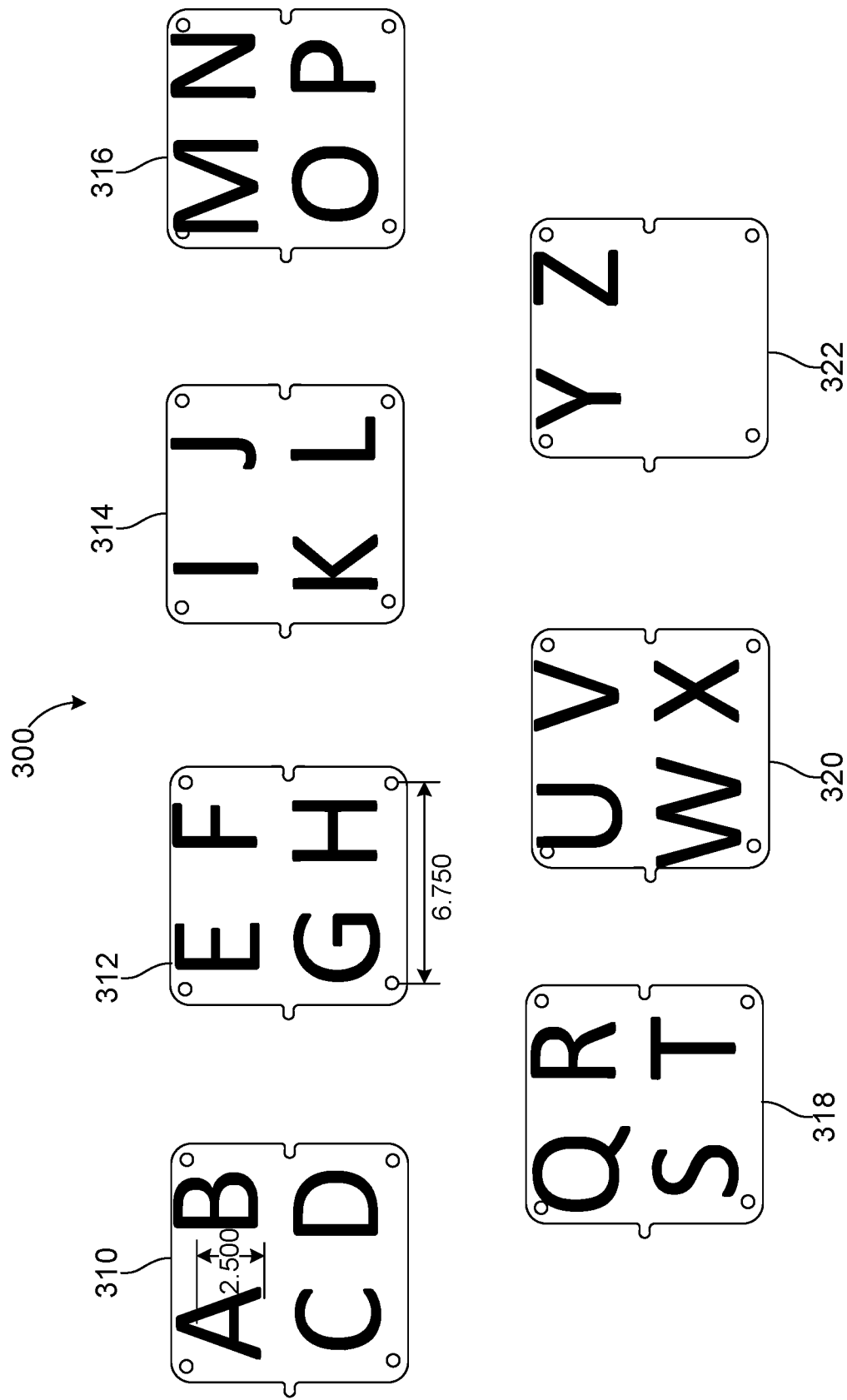
FIG. 3 illustrates an exemplary portion of a guiding tool for creating and improving bimanual independence and coordination, in accordance with an embodiment of the present invention.

Referring to FIG. 3 is illustrated an exemplary portion 300 of a guiding tool for creating and improving bimanual independence and coordination, in accordance with an embodiment of the present invention. As shown in FIG. 3, various alphabetical patterns/shapes may be employed in the substrate, i.e., 310, 312, 314, 316, 318, 320, 324, 326, etc. . . . . In one embodiment, the substrates shown in FIGS. 3 and 4 may include at least one pattern. In certain embodiments, the substrates shown in FIGS. 3 and 4 may be interlocked and secured on a surface when a user is tracing the patterns. In certain embodiments, the substrates shown in FIGS. 3 and 4 may be placed separately and secured on a surface when a user is tracing the patterns. In one embodiment, the substrates shown in FIGS. 3 and 4 may be machined, casted, or molded and the grooves/patterns may be cut into the substrates. The substrate may be made of materials including but not limited to polymer, metal, wood, glass, etc. . . . .

Figure 4:
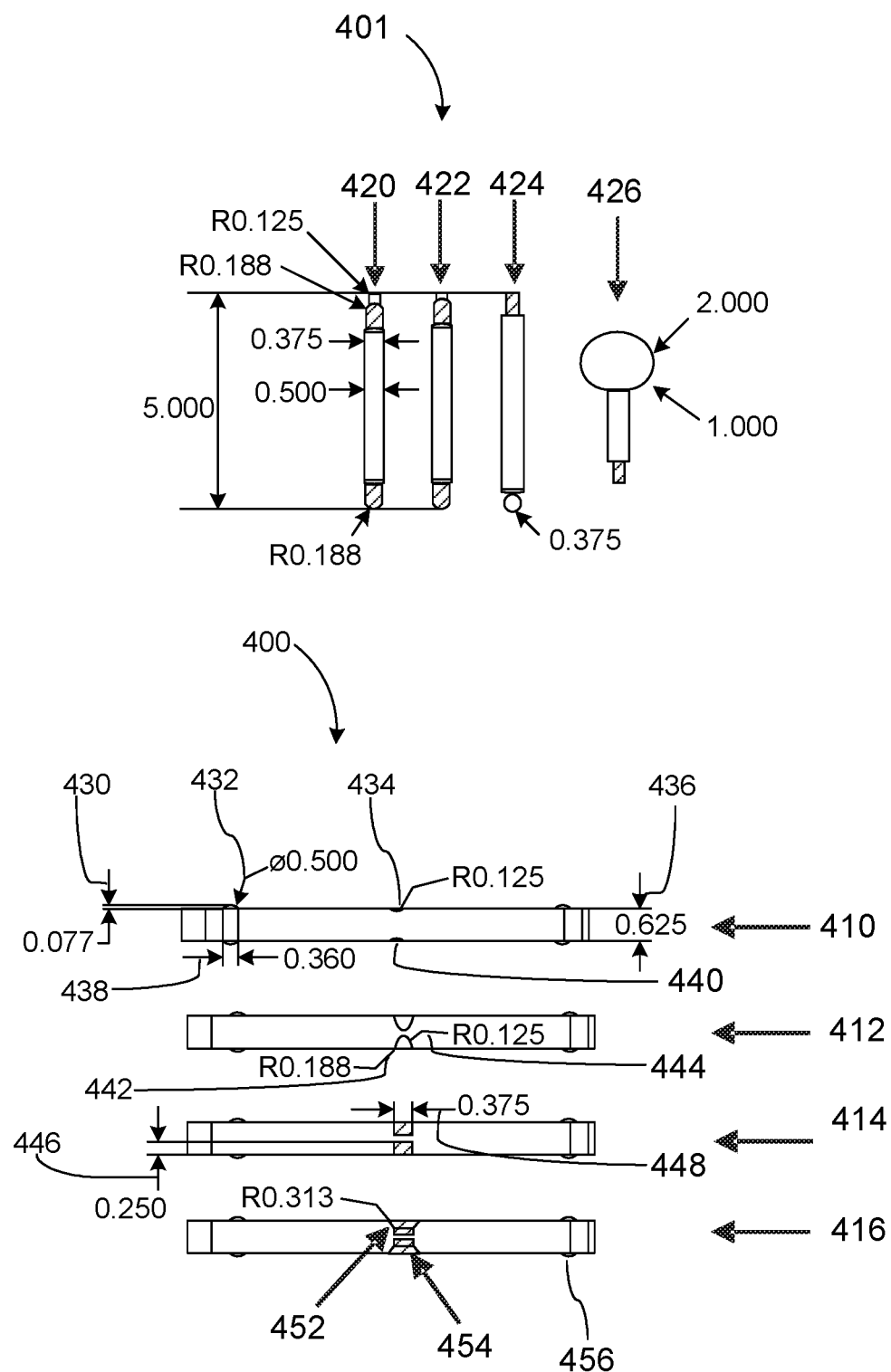
FIG. 4 illustrates an exemplary portion of a guiding tool for creating and improving bimanual independence and coordination, in accordance with an embodiment of the present invention.

In one embodiment, as described herein above, the patterns on the substrate may be formed in the form of grooves and a tracing tool, for example a stylus, may be provided to the user for tracing the patterns on the substrate using the user's upper extremities. Referring to FIG. 4 is illustrated an exemplary portion of a guiding tool 400, 401 for creating and improving bimanual independence and coordination, in accordance with an embodiment of the present invention. FIG. 4 provides cross section cutaway views of a few different designs of guiding grooves to be machined, cast, or molded into the various shapes in the four examples 400 of substrates 410, 412, 414, 416 with differently shaped/patterned and differently sized grooves. FIG. 4 also provides four examples of styluses 401, i.e., handheld groove tracking tools to use in concert with the different designs of guiding grooves that may match the differently shaped/patterned and differently sized grooves and may be appropriately used by the user. In one embodiment, the end portions of the styluses may include a tip, where the tip is shaped and sized to trace a corresponding groove, in which the tip may be shaped and sized to correspond to a groove having the same size and shape. In another embodiment, the styluses may have a handle on one end and a tracing tip on the other end portion. For example, a first end on stylus shape with number 422 may correspond with the groove in 410. A second end of stylus 422 may correspond with the groove in 412. A first end on stylus 420 may correspond with groove in 412. A second end on stylus 420 may correspond with groove 410. One of the ends on Stylus 424 may correspond with groove in 414. One of the ends on Stylus 424 may also correspond with groove in 416. An end on Stylus 426 is an alternate shape to make the styluses in order to be able to hold the styluses in the palm of your hand and the other end could be made to correspond with any of the grooves.

In one embodiment, the grooves or patterns may be made on both sides 452, 454 of a substrate. In another embodiment, the grooves or patterns may be made on one side of a substrate (not shown in figure). In the embodiment, where the grooves or patterns may be made on both sides 452, 454 of the substrates, the grooves may have the same shape and size or may have different sizes and shapes. All the substrates may include securing mechanisms, for example, anti-skid pads 456 which may be disposed on one side or both sides. Depending on whether the grooves/patterns are made on one side or both sides respectively. For example, as shown in FIG. 4, the substrate 410 may include anti-skid pads having a height 430 of about 0.077 inches (in), a curvature 432 of about 0.5000 in, a thickness 438 of about 0.360 in, a circular shaped groove on one side 434 having a radius of about 0.125 in, a circular shaped groove on other side 440 and the substrate having a thickness of about 0.625 in; the substrate 412 having a circular shaped stepped groove with multiple radii, i.e., inner step 444 having a radii of about 0.125 in and an outer step 442 having a radii of about 0.188 in with rest of the dimensions similar to that of substrate 410; the substrate 414 with a rectangular shaped groove depth 446 of about 0.250 in and a groove thickness of about 0.375 in with rest of the dimensions similar to that of substrate 410; and the substrate 416 with a groove having a radius of about 0.313 in. The radius on the stylus is made to correspond with the radius on the substrate within a tolerance acceptable for smooth operation between the two surfaces. For this application and because the tool/apparatus components would be manufactured utilizing CNC equipment or molds the necessary tolerances of 0.005 in would be easily attained and maintained.

It may be appreciated by a person with ordinary skill in the art, in light of and in accordance with the teachings of the present invention that, the size and shape of the substrates, the size and shape of the patterns on the substrates, and the size and shape of the styluses may be tailor made to the requirement of a user. Accordingly, in certain embodiments, the alphabet letters with guiding grooves may be provided in any language. In one embodiment, the size patterns are selected to utilize bigger muscles in the arms.

Figure 5:
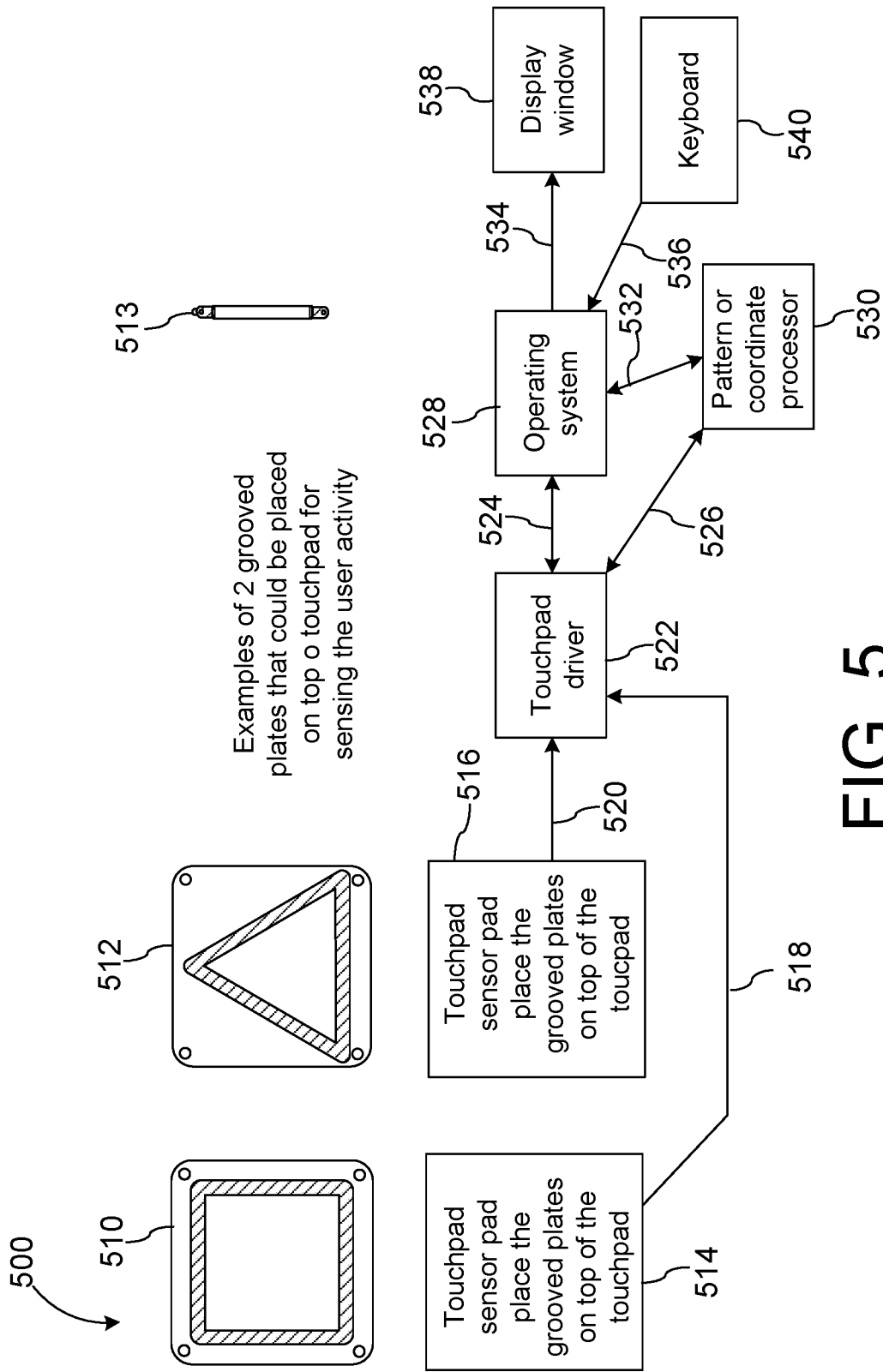
FIG. 5 illustrates an exemplary system including a guiding tool for creating and improving bimanual independence and coordination, in accordance with an embodiment of the present invention.

In one embodiment, the system including a guiding tool for creating and improving bimanual independence and coordination may include a designated software program. The designated software program may be programmed with many performance metrics, for example, rate of travel, pressure tracing pressure vs speed to measure confidence level of a user, how straight or wiggly the tracing path is, effort required by a user to complete a path, rate of travel, steadiness/smoothness of hand tracing, tracing pressure, total time to complete vs accuracy, etc. . . . . Referring to FIG. 5 is illustrated an exemplary system 500 including a guiding tool for creating and improving bimanual independence and coordination, in accordance with an embodiment of the present invention. As described with reference to FIG. 1, in one embodiment the substrate may be placed on/secured to a surface. In another embodiment, as shown in FIG. 5, the substrate, for example, a first plate 510 and a second plate 512 may be placed on a touchpad/sensor pad 514 and 516 respectively for sensing user activity. The user may be provided with a tracing tool, for example, a stylus 513. Suitable examples of the tracing tool include, but may not be limited to conductive pressure sensitive tracking tool/digitizer pen, manual stylus, various transmitting capability capacitive, blue tooth enabled, and the like. The type of stylus would be selected to correspond with the operating requirements to be compatible and or needed of the touchpad or sensing device selected. The touch pad 514, 516 may be connected 518, 520 respectively to a touchpad driver 522. The touch pad driver may be in working communication 524 with an operating/computer system 528. The touch pad driver may be in working communication 526 with a processor 530. The computer system 528 may be in working communication 532 with the processor 530. The computer system 528 may be connected to 536 or include a data input device 540. The computer system 528 may be connected 534 or include a display screen 538.

During typical operation of the system 500, a user may select two substrates, i.e., two plates with different groove patterns or two different shape blocks. In one embodiment, the two plates may be interlocked. The user may place the plates on a touchpad in front of the user one to the user's left the other to the user's right. The user may then select two groove tracking tools one for each hand that corresponds with the groove design in the plates previously selected by the user. The user may then hold one tracking tool in each hand as one would hold a writing implement as shown in FIG. 1. The user may then place the tracking tool being held in the left hand anywhere into the groove path of the plate to the left in front of the user and place the tracking tool being held in the user's right hand anywhere into the groove path of the plate on the right in front of the user. In one exemplary embodiment, the user may then begin to follow the groove path of the plate with the non-dominant hand until the user feels comfortable. Once the user feels comfortable following the groove path of the plate with the non-dominant hand, the user may start following the groove path of the other plate with the dominant hand simultaneously. The user may continue to do this until the user is comfortable with using both hands simultaneously in the groove path of the plates. As described with reference to FIG. 5, the touchpads may be connected with a touchpad driver, which may be in working communication with a computer system and a processor. The processor may be in working communication with the computer system. The computer system may include an input device and a display screen. In one embodiment, the user may now be ready to try and change the direction in the groove path of the plate with the non-dominant hand until the user can change direction with either hand without feeling interference. It may be appreciated by a person with ordinary skill in the art, in light of and in accordance with the teachings of the present invention that, it may be easier to overcome a feeling of interference by initially following the groove path of the plates slowly and repetitively until new connections in the brain are established and the user starts feeling the results, i.e., decrease in bimanual interference. It may be appreciated by a person with ordinary skill in the art, in light of and in accordance with the teachings of the present invention that, it may take different lengths of time for different people to achieve the comfort of non-interference. In one embodiment, as mentioned hereinabove several short sessions spread over time may provide better results than the results obtained with one long session. In one embodiment, the touchpad placed under each grooved pattern provides constant feedback while recording and monitoring the movement uniformity or speed differences of both hands as the stylus is moving, following the grooved tracks in the plate. Based on the movement uniformity or speed differences of both hands as the stylus is moving, the computer system 528 may recognize if a user has reached a certain predetermined level of bimanual independence.

In one embodiment, the system described in FIG. 5 may include a touchpad pad placed under and fixed to the substrate, the substrate having open grooves such that the stylus tip can go through the groove and trace onto the touchpad, which communicates back the x-y location (and maybe pressure) information in real-time to the computer system 528, and processes the performance metrics and provides suitable training/performance feedback signals to the user. In an alternative embodiment, the pattern traced by the stylus is transferred to the touchpad via an applied pressure. Based on the applied pressure or touch sensitiveness, the computer system 528 may recognize if a user has reached predetermined levels of bimanual independence. For example, the operating system may measure the time it takes for the stylus of a user to traverse a given shape. As the traversal time becomes shorter, it may be flagged by the operating system as an indication of a predetermined level of bimanual independence.

It may be appreciated by a person with ordinary skill in the art, in light of and in accordance with the teachings of the present invention, the computing system 528 may connect to any number of devices with virtually any wired and/or wireless means. The computing system 528 may connect to virtually any device by means such as, but not limited to, Bluetooth connection, Ethernet cable, USB cable, WIFI, IRDA, etc. In an alternative embodiment of the present invention, the computing system 528 may send a translation of motion. The computer system along with the touchpad, is a translator of motion, giving the user a visual indication of position movement relative to a referenced point of origin or within a set referenced area. In additional embodiments, the styluses include a passive tip or active tip pen with electronic components that may allow users to directly work onto the LCD screen or touchscreen surface of a computing device such as a smartphone, tablet computer screen, Ultrabook, laptop or desktop computer with various operating systems that provide feedback to users of the present invention. This may allow the users to monitor their progress as they use the new tool teaching method for overcoming bimanual interference and achieving bimanual independence.

It may be appreciated by a person with ordinary skill in the art, in light of and in accordance with the teachings of the present invention that the system may include a server. The server may be virtually any computing platform such as, but not limited to, a computer cluster, a laptop, a tablet, a smartphone, etc. In another embodiment of the present invention, server may be a cloud based server or IOT based server. The server may be capable of sharing the results of the tests done to decrease bimanual interference with those who have a need for the data with the authorization of the user. The server may also be capable of sending alerts to the user for scheduling practice sessions and performance evaluations after every session. The historical data stored in the server may be accessed from the server by authorized persons.

It may be appreciated by a person with ordinary skill in the art, in light of and in accordance with the teachings of the present invention, a database may be virtually any data storage device or devices. Database may be, but not limited to, a plurality of data servers, a memory card. In another embodiment of the present invention, database may be a memory card connected to server.

It may be appreciated by a person with ordinary skill in the art, in light of and in accordance with the teachings of the present invention, that database may contain virtually any data to work and/or improve the exemplary system including a guiding tool for creating and improving bimanual independence and coordination. Database may include, without limitation, typical problems associated with bimanual interference, time taken by different users to achieve various levels of bimanual independence, learning curves for difference individuals including pressure applied while tracing patterns, comparisons between pressure applied by dominant hand and non-dominant hand, time taken to change direction applying even pressure by a user, and the like.

It may be appreciated by a person with ordinary skill in the art, in light of and in accordance with the teachings of the present invention, the designated computer program for the exemplary system including a guiding tool for creating and improving bimanual independence and coordination 500 may partially or completely be contained in a local computing platform and/or network that includes the tool/apparatus.

Figure 6:
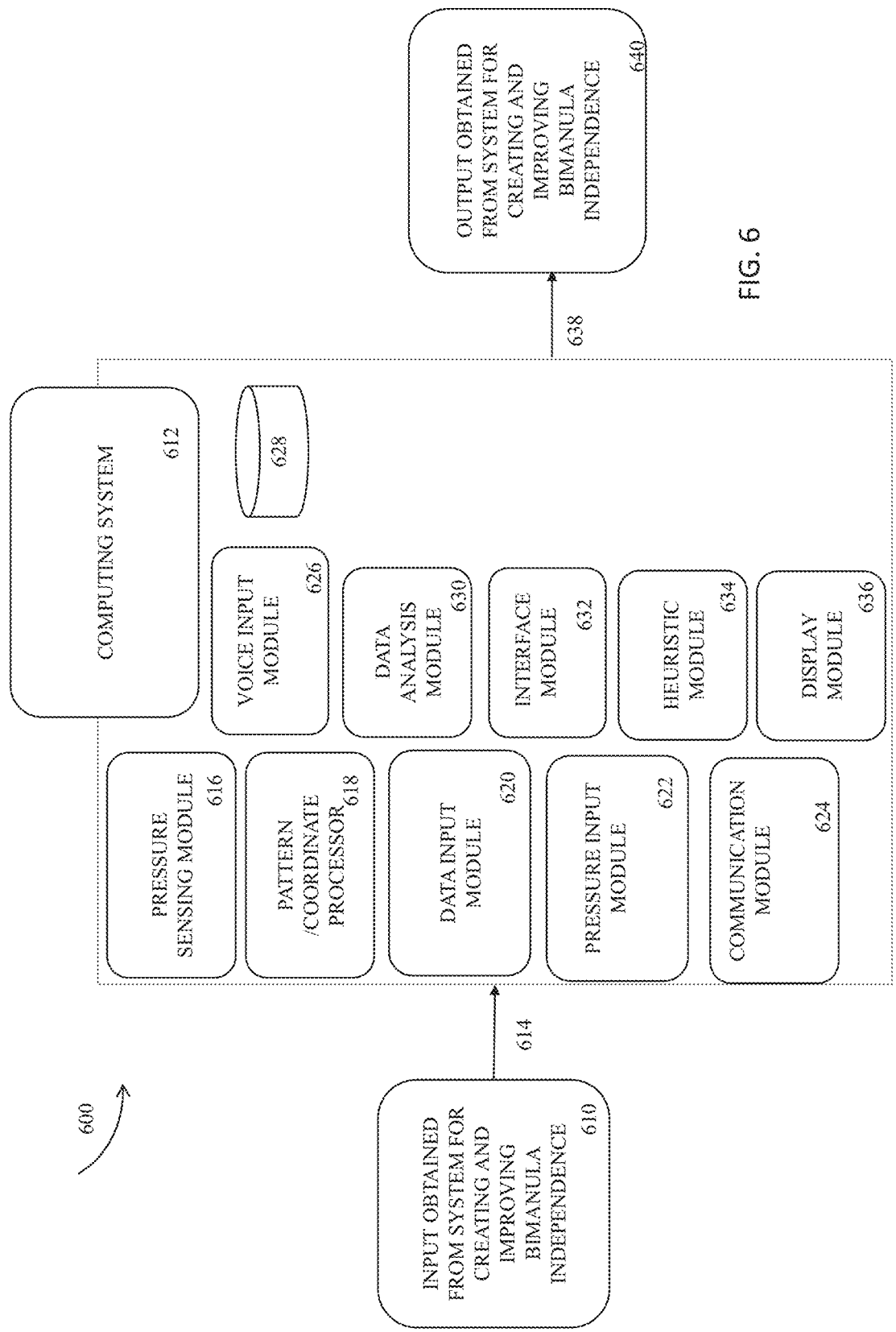
FIG. 6 illustrates an architecture of an exemplary system including a guiding tool for creating and improving bimanual independence and coordination, in accordance with an embodiment of the present invention.

Referring to FIG. 6 illustrates an architecture of an exemplary system 600 including a guiding tool for creating and improving bimanual independence and coordination, in accordance with an embodiment of the present invention. The system 600 provides the architecture for computing system 612 for receiving 614 input 612 from a tool/apparatus. The computing system 612 architecture in a system including a guiding tool for creating and improving bimanual independence and coordination may include a pressure sensing module 616, a pattern/coordinate processing module 618, a data input module 620, a pressure input module 622, a communication module 624, a voice input module 626, a database 628, a data analysis module 630, an interface module 632, a heuristic module 634, and a display module 636. The pressure sensing module 616 may have a means of sensing pressure, such as, without limitation, a processing unit, a computer, or a server to execute computer code and/or algorithms from a non-transitory computer readable medium for pressure sensing. A pattern/coordinate processing module 618 may have a means of processing a pattern/coordinate, such as, without limitation, a processing unit, a computer, or a server to execute computer code and/or algorithms from a non-transitory computer readable medium for pattern/coordinate processing. A data input module 620 may have a means of providing input data, such as, without limitation, sensors and/or a processing unit, and providing 638 output data 640 for a user with reference to creating and improving bimanual independence and coordination. A pressure input module 622 may have a means of providing back pressure to the user, such as, without limitation, a processing unit, a computer, or a server to execute computer code and/or algorithms from a non-transitory computer readable medium for redirecting the user to the pattern/groove in the tool/apparatus in the process of trying to achieve bimanual independence. A communication module 624, may have a means of communicating such as, without limitation, a processing unit, a computer, or a server to execute computer code and/or algorithms from a non-transitory computer readable medium for communicating the information from the touchpad or the data input module or the processing module to the computer system. The voice input module 626 may have a means of processing a voice such as, without limitation, a processing unit, a computer, or a server to execute computer code and/or algorithms from a non-transitory computer readable medium for voice recognition. A voice input module 626 may have a means of enabling the user to provide vocal instructions to the computing system 612 for selecting patterns, scheduling, and determining tests periods, such as, without limitation, voice receptors and/or a processing unit, and providing a sound input for listing and scheduling sessions for creating and improving bimanual independence. The voice input module 226 may also be used for security purposes to ensure that the user is authorized to use the system 600. A database 628 may have a means for storing data, such as, without limitation, a processing unit, a computer, or a server to execute computer code and/or algorithms from a non-transitory computer readable medium for providing current data, historical data, statutory data, etc. . . . for a user aiming to achieve bimanual independence and authorized users for studying the tests, processes etc. for attempting to achieve bimanual independence. A data analysis module 630 may have a processing means such as, without limitation, a processing unit, a computer, or a server to execute computer code and/or algorithms from a non-transitory computer readable medium for analyzing the various data inputs and providing the analysis to the user to determine/predict sessions needed to achieve bimanual independence. An interface module 632 may have a processing means such as, without limitation, a processing unit, a computer, or a server to execute computer code and/or algorithms from a non-transitory computer readable medium for interfacing between the various modules. A heuristic module 634 may have a processing means such as, without limitation, a processing unit, a computer, or a server to execute computer code and/or algorithms from a non-transitory computer readable medium for processing the data/information provided by the data analyzing module and providing pointers to the user based on a self-learning model. It may be appreciated by a person with ordinary skill in the art, in light of and in accordance with the teachings of the present invention, that virtually any algorithm and/or computer code may be used to self-learn using the heuristic module 240. Self-learning algorithms and/or methods may include, without limitation, the use of Artificial Intelligence. self-learning algorithms, neural networks, etc. The algorithms may be coupled with smart sensors and electromechanical systems. A display module 636 may have a means to display to the user who may be enabled to observe both patterns, speed, and direction of travel in order to make corrections to maintain speed uniformity or purposeful speed differences all to achieve bimanual independence without feeling or experiencing bimanual interference, such as, without limitation, a display screen 538 on a computer system 528, to a user.

It may be appreciated by a person with ordinary skill in the art, in light of and in accordance with the teachings of the present invention, that one or more modules may be embodied in a single device. In an alternative embodiment of the present invention, all modules may be embodied in a desktop, except the data input module that may be embodied in a smartphone device which would be capable of enabling a user to use the tool/apparatus and send communication to the computing system 612.

It may be appreciated by a person with ordinary skill in the art, in light of and in accordance with the teachings of the present invention, that virtually any algorithm and/or computer code may be used to recognize a sound on voice input module 626. Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from a voice/sound.

It may be appreciated by a person with ordinary skill in the art, in light of and in accordance with the teachings of the present invention, that there may be a plurality of the same modules in the computing system 612 for creating and improving bimanual independence. A plurality of modules such as, without limitation, pressure sensing module 616, a pattern/coordinate processing module 618, a data input module 620, a pressure input module 622, a communication module 624, a voice input module 626, a database 628, a data analysis module 630, an interface module 632, a heuristic module 634, and a display module 636 may be present in the computing system 612. The plurality of similar modules may work in parallel or independently to improve the throughput and/or speed the computing system 612. In an alternative embodiment of the present invention, a plurality of a pattern/coordinate processing module 618 may be connected to the computing system 612 via wired and wireless connections to access resources from different wired and wireless networks. In still another alternative embodiment of the present invention, a plurality of similar modules may form a secondary computing system 612 capable of seamlessly substituting a missing and/or failing module.

It may be appreciated by a person with ordinary skill in the art, in light of and in accordance with the teachings of the present invention, that one or more modules may transmit necessary information to a tech support server that is on an accessible network or over the internet. In an alternative embodiment of the present invention, additional information may be sent to a server to alleviate processing load.

It may be appreciated by a person with ordinary skill in the art, in light of and in accordance with the teachings of the present invention, that any module in computing system 612 may perform data manipulation. Data manipulation such as, but not limited to, compression, encryption, formatting, and the like. In an alternative embodiment of the present invention, any module sending data may first compress the data prior to data transmission.

Figure 7:
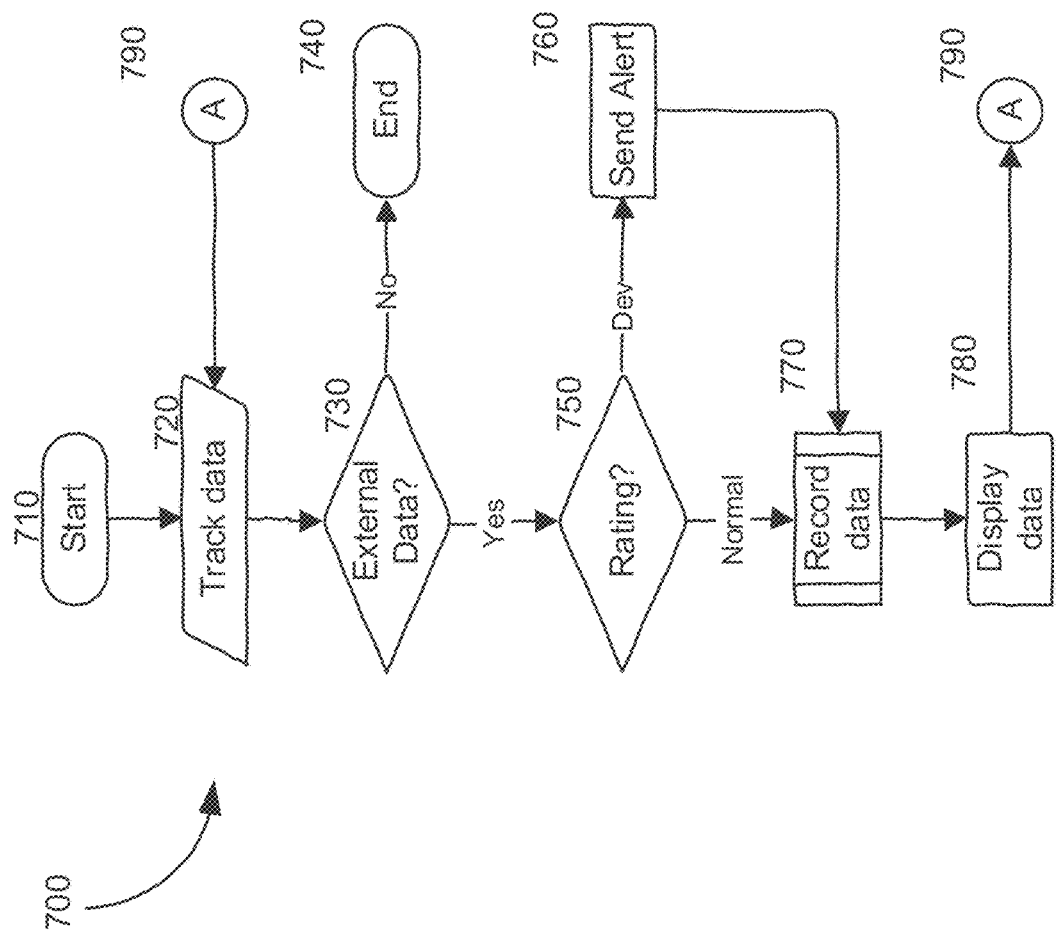
FIG. 7 illustrates a flow chart illustrating an exemplary process for creating and improving bimanual independence and coordination using a guiding tool, in accordance with an embodiment of the present invention.

FIG. 7 illustrates a flow chart illustrating an exemplary process 700 for creating and improving bimanual independence and coordination using a guiding tool, in accordance with an embodiment of the present invention. The process 700 starts at step 710. In step 720, the system tracks the movement of the stylus on the substrate. In step 730, determines if there is stylus activity. If data is available, performance is calculated in step 750. If data is not available, then the process ends. In step 770, performance data is recorded. In step 780, performance data is displayed to a user then data tracking resumes in step 790. Process 700 ends in step 740 when no new data is detected.

In certain embodiments, the substrate may include a flat plate like structure. In certain embodiments, the substrate may include a plate like structure with varying thickness. In some embodiments, the groves may include varying heights and/or depths. In other embodiments, the substrate is a touch screen to display the patterns (Step 780), detect the tracing out of them (Step 730), and provide signal feedback to train and encourage the user (Step 760).

In one embodiment, an electromagnetic tracking device in conjunction with a magnetic sensor at the end of a user's finger or a stylus may be employed to trace the pattern (Step 720). For example, the guiding path may be created with a shaped magnetic field a ferrous tracking tool may be used as the tracking tool or stylus.

In one embodiment, a Bluetooth® stylus with pressure transmitting capabilities may be employed (Step 730). This may allow the user to measure (Step 750) and record the progress and gains (Step 770) being made towards attaining bimanual independence without interference. Performance metrics to measure confidence may include, but not limited to, rate of travel, pressure tracing pressure vs speed, how straight or wiggly the tracing path is, steadiness/smoothness of hand tracing, tracing pressure, total time to complete vs accuracy, etc. Performance ratings may be used to train improvements and motivate the user to try harder/better.

In one embodiment, a side pressure sensing stylus may be employed (Step 730) that would record deviation from the center of the groove or a referenced side (Step 750). In various embodiments, a user may be provided an alert if there is any deviation (Step 760). The alerts may include, but not be limited to, audible alert (e.g., a loud/pitch to annoy the ear as a penalty or positive sounds to reinforce good performance), visual effect on display screen (e.g., flashing screen with disturbing imagery/strobing or harsh colors as penalties, or soothing imagery/colors as a reward)), visual (the plate may light up, or there may be light effects on the display screen) (Step 780).

In one embodiment, an audible alert may be provided (Step 760) using an audible device to warn a user of hesitation sensed during the movements of either arm. In various embodiments, the audible alert/warning may include, but not be limited to a pleasant sound, a sound of such volume and frequency as to be very uncomfortable for a user (i.e., loud/pitch to annoy the ear as a penalty or positive sounds to reinforce good performance), and the like.

In one embodiment, a reverse or inverse audible or visual alert system may be employed (Step 760). For example, an audible warning system may constantly provide music pleasant to the user and the music would stop as a warning indicating to the user that they have deviated from either pattern or boundaries or the system sensed hesitation. Similarly, if it is a visual alert system (Step 780) a continuous light may flash and the light may stop flashing or may be switched off as a waning indicating to the user that they have deviated from either pattern or boundaries or the system sensed hesitation (Step 760).

In one embodiment, the two patterns may be drawn on a computer screen with lines as boundaries for the user to follow with a stylus (Step 780). In one embodiment, there may be an electric device that is connected to the computer such as a smartphone, tablet computer screen, Ultrabook, laptop or desktop computer. If the user were to deviate out of the boundaries of the two different patterns on the screen, an instantaneous signal may be sent to a device connected to each of the user's wrists (Step 760). The device may produce a mild electric shock (not to damage but to create discomfort, progressive electric shock feedback as training penalties, etc. . . . ), a vibration, a visual alert, an audible alert, and the like to attract the attention of the user and guide them back to following the lines as boundaries on the computer screen.

In one embodiment, the user may be provided with a motorized joystick. The user may use the two joysticks (whole hand or pinching like for a pencil), and be presented with a visual of the pattern that is being traced on each joystick (Step 780), wherein the user would be force guided to trace out a different pattern for each hand (Step 720). The joysticks may provide force feedback sensing (maybe detecting motor currents). In one embodiment, if the user is able to predict and follows the pattern being traced, i.e., measured by lower motor currents, the performance rating for the user may be set at a predetermined performance level criteria overcoming bimanual interference as there are better chances of forming the neurological pathways.

In one embodiment, are provided two independent robotic arms or motorized mechanical arms each with a hand grip for the user to grip one with the dominant hand and one with the non-dominate hand the other hand. The robotic arms may be programmed to simultaneously move in a horizontal or vertical plane, forcing the respective hand to follow the corresponding arm's preselected patterns, such as a triangle shape programmed for the dominant hand arm and a star shape programmed for the other arm. In one embodiment, the robotic arms may be enabled with foot actuation, verbal command, or with the use of a preprogrammed timer to independently and without warning reverse direction of travel of each arm pattern. In various embodiments, all movement of the arms may be constrained to within the normal range of reach or travel of a normal size person while in a stationary i.e., standing or sitting position. In one embodiment, the robotic arm system for creating and improving bimanual independence may not require a groove for the tool to follow. Accordingly, the robotic arm may be programmed to independently and simultaneously move in different patterns, forcing the user to hold onto the arm even while feeling interference. It may be appreciated by a person with ordinary skill in the art, in light of and in accordance with the teachings of the present invention that, using robotic arms may possibly speed up the training time needed to achieve bimanual independence without interference.

In various embodiments, the tool/apparatus described herein may be designed with specific different patterns to be used in order to train a user to perform specific tasks that otherwise cause interference that the user needs to overcome, such as conducting an orchestra, playing piano, or training surgeons hands to be able to function independently without interference in order to use robotic arms to perform surgery, and the like.

In one embodiment, the guiding tools/apparatus, systems, and methods disclosed herein are advantageous in that they may assist a user in achieving controlled, independent, asymmetrical, movement of the arms through totally different configurations or shapes with each arm. The guiding tools/apparatus, systems, and methods disclosed herein may develop/improve a user's ability to bimanually perform independent bimanual activities, (not simultaneously performed everyday activities such as answering a telephone and writing down a note.) resulting in the creation of the necessary new neurological connections in order to simultaneously and independently perform different tasks with each arm. The guiding tools/apparatus, systems, and methods disclosed herein may assist a user in achieving controlled, independent, asymmetrical, simultaneous movement of the arms through totally different configurations, patterns or shapes with each arm. Accordingly, the guiding tools/apparatus, systems, and methods disclosed herein is focused on overcoming pervasive spatial interference when a user plans to produce or perform non-symmetric movements. The consequence of using the tools/apparatus described herein may include the creation of new neurological connections within the brain that may enable a person to learn or relearn abilities in a way not normally possible through doing everyday tasks and activities. The guiding tools/apparatus, systems, and methods disclosed herein may be helpful to rehabilitative therapists, for example, use when dealing with dyslexia, after stroke effects, etc. . . . ; for teachers to use when dealing with learning disabilities; pianists, surgeons; a hands-on developmental toy for children in order to enhance dextral abilities at a young age, and the like.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 8:
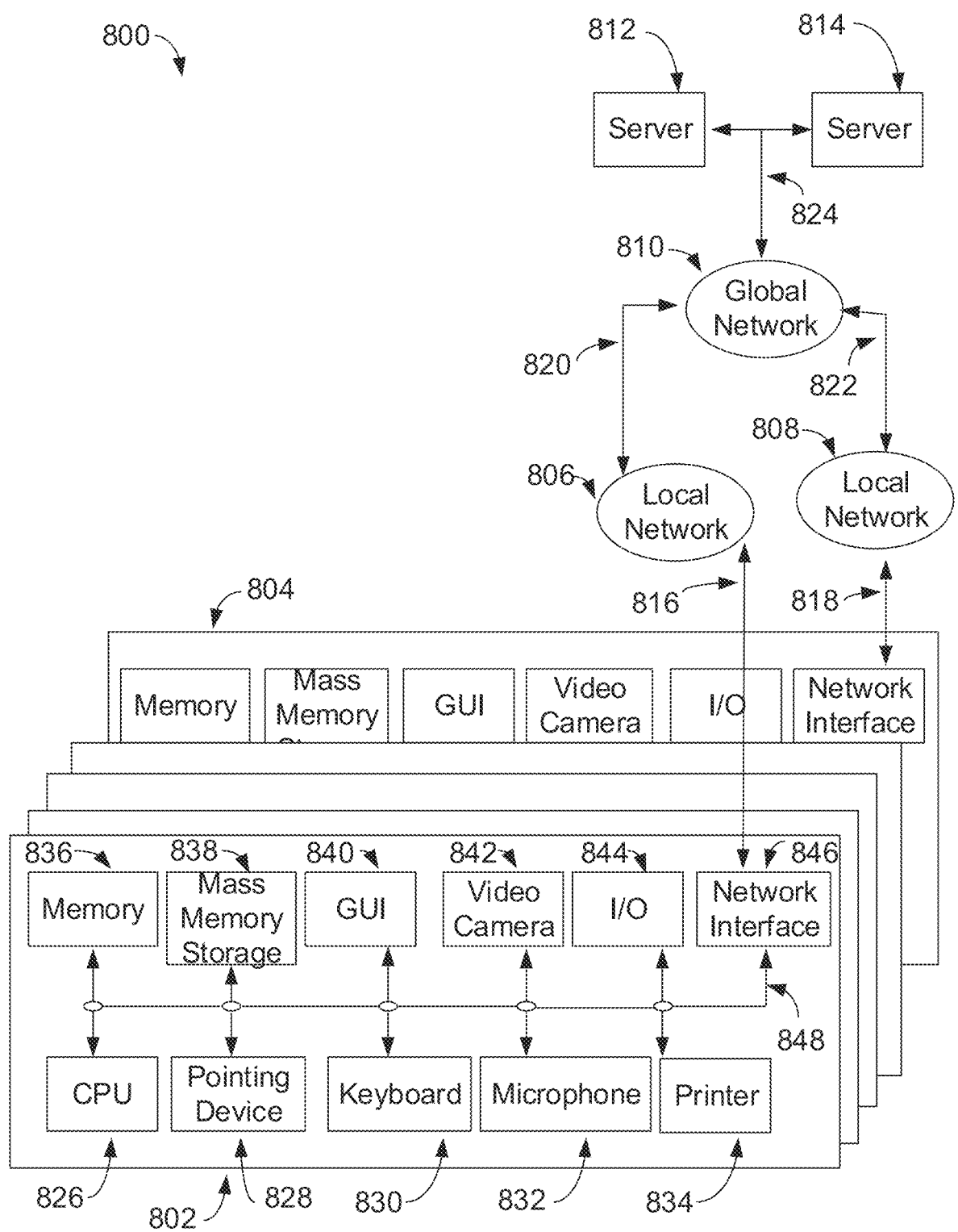
FIG. 8 is a block diagram depicting an exemplary client/server system which may be used by an exemplary web-enabled/networked embodiment of the present invention.

FIG. 8 is a block diagram depicting an exemplary client/server system which may be used by an exemplary web-enabled/networked embodiment of the present invention.

A communication system 800 includes a multiplicity of clients with a sampling of clients denoted as a client 802 and a client 804, a multiplicity of local networks with a sampling of networks denoted as a local network 806 and a local network 808, a global network 810 and a multiplicity of servers with a sampling of servers denoted as a server 812 and a server 814.

Client 802 may communicate bi-directionally with local network 806 via a communication channel 816. Client 804 may communicate bi-directionally with local network 808 via a communication channel 818. Local network 806 may communicate bi-directionally with global network 810 via a communication channel 820. Local network 808 may communicate bi-directionally with global network 810 via a communication channel 822. Global network 810 may communicate bi-directionally with server 812 and server 814 via a communication channel 824. Server 812 and server 814 may communicate bi-directionally with each other via communication channel 824. Furthermore, clients 802, 804, local networks 806, 808, global network 810 and servers 812, 814 may each communicate bi-directionally with each other.

In one embodiment, global network 810 may operate as the Internet. It will be understood by those skilled in the art that communication system 800 may take many different forms. Non-limiting examples of forms for communication system 800 include local area networks (LANs), wide area networks (WANs), wired telephone networks, wireless networks, or any other network supporting data communication between respective entities.

Clients 802 and 804 may take many different forms. Non-limiting examples of clients 802 and 804 include personal computers, personal digital assistants (PDAs), cellular phones and smartphones.

Client 802 includes a CPU 826, a pointing device 828, a keyboard 830, a microphone 832, a printer 834, a memory 836, a mass memory storage 838, a GUI 840, a video camera 842, an input/output interface 844, and a network interface 846.

CPU 826, pointing device 828, keyboard 830, microphone 832, printer 834, memory 836, mass memory storage 838, GUI 840, video camera 842, input/output interface 844 and network interface 846 may communicate in a unidirectional manner or a bi-directional manner with each other via a communication channel 848. Communication channel 848 may be configured as a single communication channel or a multiplicity of communication channels.

CPU 826 may be comprised of a single processor or multiple processors. CPU 826 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 836 is used typically to transfer data and instructions to CPU 826 in a bi-directional manner. Memory 836, as discussed previously, may include any suitable computer-readable media, intended for data storage, such as those described above excluding any wired or wireless transmissions unless specifically noted. Mass memory storage 838 may also be coupled bi-directionally to CPU 826 and provides additional data storage capacity and may include any of the computer-readable media described above. Mass memory storage 838 may be used to store programs, data and the like and is typically a secondary storage medium such as a hard disk. It will be appreciated that the information retained within mass memory storage 838, may, in appropriate cases, be incorporated in standard fashion as part of memory 836 as virtual memory.

CPU 826 may be coupled to GUI 840. GUI 840 enables a user to view the operation of computer operating system and software. CPU 826 may be coupled to pointing device 828. Non-limiting examples of pointing device 828 include computer mouse, trackball and touchpad. Pointing device 828 enables a user with the capability to maneuver a computer cursor about the viewing area of GUI 840 and select areas or features in the viewing area of GUI 840. CPU 826 may be coupled to keyboard 830. Keyboard 830 enables a user with the capability to input alphanumeric textual information to CPU 826. CPU 826 may be coupled to microphone 832. Microphone 832 enables audio produced by a user to be recorded, processed and communicated by CPU 826. CPU 826 may be connected to printer 834. Printer 834 enables a user with the capability to print information to a sheet of paper. CPU 826 may be connected to video camera 842. Video camera 842 enables video produced or captured by user to be recorded, processed and communicated by CPU 826.

CPU 826 may also be coupled to input/output interface 844 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 826 optionally may be coupled to network interface 846 which enables communication with an external device such as a database or a computer or telecommunications or internet network using an external connection shown generally as communication channel 816, which may be implemented as a hardwired or wireless communications link using suitable conventional technologies. With such a connection, CPU 826 might receive information from the network, or might output information to a network in the course of performing the method steps described in the teachings of the present invention.

Figure 9:
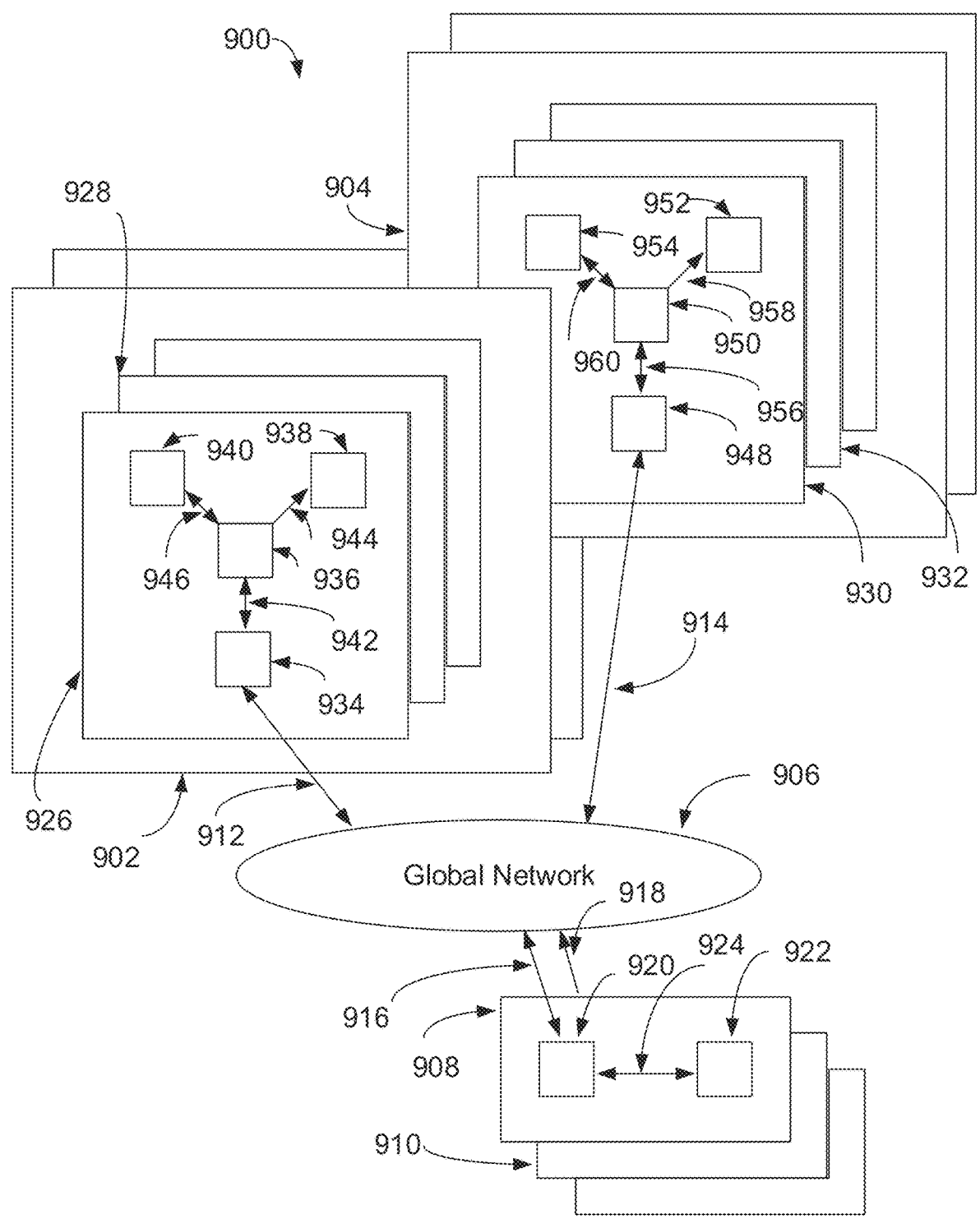
FIG. 9 illustrates a block diagram depicting a conventional client/server communication system.

FIG. 9 illustrates a block diagram depicting a conventional client/server communication system.

A communication system 900 includes a multiplicity of networked regions with a sampling of regions denoted as a network region 902 and a network region 904, a global network 906 and a multiplicity of servers with a sampling of servers denoted as a server device 908 and a server device 910.

Network region 902 and network region 904 may operate to represent a network contained within a geographical area or region. Non-limiting examples of representations for the geographical areas for the networked regions may include postal zip codes, telephone area codes, states, counties, cities and countries. Elements within network region 902 and 904 may operate to communicate with external elements within other networked regions or within elements contained within the same network region.

In some implementations, global network 906 may operate as the Internet. It will be understood by those skilled in the art that communication system 900 may take many different forms. Non-limiting examples of forms for communication system 900 include local area networks (LANs), wide area networks (WANs), wired telephone networks, cellular telephone networks or any other network supporting data communication between respective entities via hardwired or wireless communication networks. Global network 906 may operate to transfer information between the various networked elements.

Server device 908 and server device 910 may operate to execute software instructions, store information, support database operations and communicate with other networked elements. Non-limiting examples of software and scripting languages which may be executed on server device 908 and server device 910 include C, C++, C # and Java.

Network region 902 may operate to communicate bi-directionally with global network 906 via a communication channel 912. Network region 904 may operate to communicate bi-directionally with global network 906 via a communication channel 914. Server device 908 may operate to communicate bi-directionally with global network 906 via a communication channel 916. Server device 910 may operate to communicate bi-directionally with global network 906 via a communication channel 918. Network region 902 and 904, global network 906 and server devices 908 and 910 may operate to communicate with each other and with every other networked device located within communication system 900.

Server device 908 includes a networking device 920 and a server 922. Networking device 920 may operate to communicate bi-directionally with global network 906 via communication channel 916 and with server 922 via a communication channel 924. Server 922 may operate to execute software instructions and store information.

Network region 902 includes a multiplicity of clients with a sampling denoted as a client 926 and a client 928. Client 926 includes a networking device 934, a processor 936, a GUI 938 and an interface device 940. Non-limiting examples of devices for GUI 938 include monitors, televisions, cellular telephones, smartphones and PDAs (Personal Digital Assistants). Non-limiting examples of interface device 940 include pointing device, mouse, trackball, scanner and printer. Networking device 934 may communicate bi-directionally with global network 906 via communication channel 912 and with processor 936 via a communication channel 942. GUI 938 may receive information from processor 936 via a communication channel 944 for presentation to a user for viewing. Interface device 940 may operate to send control information to processor 936 and to receive information from processor 936 via a communication channel 946. Network region 904 includes a multiplicity of clients with a sampling denoted as a client 930 and a client 932. Client 930 includes a networking device 948, a processor 950, a GUI 952 and an interface device 954. Non-limiting examples of devices for GUI 938 include monitors, televisions, cellular telephones, smartphones and PDAs (Personal Digital Assistants). Non-limiting examples of interface device 940 include pointing devices, mousse, trackballs, scanners and printers. Networking device 948 may communicate bi-directionally with global network 906 via communication channel 914 and with processor 950 via a communication channel 956. GUI 952 may receive information from processor 950 via a communication channel 958 for presentation to a user for viewing. Interface device 954 may operate to send control information to processor 950 and to receive information from processor 950 via a communication channel 960.

For example, consider the case where a user interfacing with client 926 may want to execute a networked application. A user may enter the IP (Internet Protocol) address for the networked application using interface device 940. The IP address information may be communicated to processor 936 via communication channel 946. Processor 936 may then communicate the IP address information to networking device 934 via communication channel 942. Networking device 934 may then communicate the IP address information to global network 906 via communication channel 912. Global network 906 may then communicate the IP address information to networking device 920 of server device 908 via communication channel 916. Networking device 920 may then communicate the IP address information to server 922 via communication channel 924. Server 922 may receive the IP address information and after processing the IP address information may communicate return information to networking device 920 via communication channel 924. Networking device 920 may communicate the return information to global network 906 via communication channel 916. Global network 906 may communicate the return information to networking device 934 via communication channel 912. Networking device 934 may communicate the return information to processor 936 via communication channel 942. Processor 946 may communicate the return information to GUI 938 via communication channel 944. User may then view the return information on GUI 938. It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing guiding tools/apparatus for creating and improving bimanual independence and/or co-ordination according to the present invention will be apparent to those skilled in the art. Various aspects of the invention have been described above by way of illustration, and the specific embodiments disclosed are not intended to limit the invention to the particular forms disclosed. The particular implementation of the guiding tools/apparatus for creating and improving bimanual independence and/or co-ordination may vary depending upon the particular context or application. By way of example, and not limitation, the guiding tools/apparatus for creating and improving bimanual independence and/or co-ordination described in the foregoing were principally directed to eliminate or minimize bimanual interference; however, similar techniques may instead be applied to improve dexterity of children, as a game, etc. . . . , which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
   a first guiding mechanism, wherein said first guiding mechanism is configured to be operable for improving bimanual independence or coordination of a user, in which said first guiding mechanism comprises:
   a first substrate implement characterized by:
     a first side and a second side;
     a first groove contrivance machined, molded, or casted into said first side without going through said second side;
     in which said first groove contrivance comprises a first predetermined pattern and a predetermined width;
   a first tracing tool including:
     a first end portion, in which said first end portion comprises a tip with a first predetermined diameter size and shape;
     wherein said first predetermined diameter size and shape is configured to correspond to said first predetermined width of said first groove contrivance;
     wherein said first predetermined diameter size and shape at the tip of said first end portion is constructed to be operable for tracing said first groove contrivance without going through said second side;
   a second guiding mechanism, wherein said second guiding mechanism is configured to be operable for improving bimanual independence or coordination of the user, in which said second guiding mechanism comprises:
   a second substrate implement characterized by;
     a first surface and a second surface;
     a second groove contrivance with a second predetermined width and pattern;
     wherein said second groove contrivance is machined, molded or casted into said first surface without going through said second surface;
   a second tracing tool including:
     a second end portion, in which said second end portion containing a tip with a second predetermined diameter size and shape;
     wherein said second end portion is configured to correspond to said second groove contrivance; and
     wherein said tip of said second tracing tool is operable for tracing said first groove contrivance without going through said second surface.

2. The system of claim 1, wherein said first predetermined pattern or width of said first groove contrivance matches or different from said second predetermined pattern or width of said second groove contrivance.

3. The system of claim 2,
   in which said first guiding mechanism is configured to be operable for being used simultaneously with said second guiding mechanism to improve said bimanual independence and coordination;
   wherein said first tracing tool is operable for following said first groove contrivance with one hand of the user; and
   wherein said second tracing tool is operable for following said second groove contrivance with other hand of the user.

4. The system of claim 3, in which each of said first and second tracing tools further including a second end portion, in which said second end portion comprises a handle.

5. The system of claim 3, in which said first substrate implement comprises at least one of, a screw, and a nut-bolt arrangement, configured to secure said second side of said first substrate implement to a first surface.

6. The system of claim 2, in which said first predetermined pattern of said first substrate implement comprises at least a proximate square shape.

7. The system of claim 6, in which said second predetermined pattern of said second substrate implement comprises at least a proximate triangle shape.

8. The system of claim 2, in which said first predetermined pattern of said first substrate implement comprises at least one of, a circle shape, an eight shape, a diamond shape, and a star shape.

9. The system of claim 8, in which said second predetermined pattern of said second substrate implement comprises at least an alphabetical shape.

10. The system of claim 1, in which said first substrate implement further comprising an anti-skid pad that is configured to secure said first substrate implement to a first structure, and in which said second substrate implement further comprising an anti-skid pad that is configured to secure said second substrate implement to a second structure.

11. The system of claim 1, in which each of said first and second tracing tools further comprising a second end portion, in which said second end portion comprises a tip with a third predetermined diameter size and shape.

12. The system of claim 11, in which said second substrate implement further comprises at least one of, a screw, and a nut-bolt arrangement, that is configured to secure said second substrate implement to a second surface.

13. The system of claim 1, in which said first and second substrate implements comprises interlocking notch that is configured to attach said first and second substrate implements.

14. The system of claim 1, further comprising at least one of, a first touchpad and a first sensor pad, and in which said first tracing tool further include at least one of, a conductive pressure sensitive tracking tool, a conductive pressure sensitive digitizer pen, and a conductive pressure sensitive manual stylus, wherein said at least one of, a first touchpad and a first sensor pad, is configured to sense an activity of said first tracing tool.

15. The system of claim 14, further comprising at least one of, a second touchpad and a second sensor pad, and in which said second tracing tool further include at least one of, a conductive pressure sensitive tracking tool, a conductive pressure sensitive digitizer pen, and a conductive pressure sensitive manual stylus, wherein said at least one of, a second touchpad and a second sensor pad, is configured to sense an activity of said second tracing tool.

16. The system of claim 15, wherein said system is configured to record, save and display said sensed activity of said first and second tracing tool to be provided as feedback to the user.

17. A system consisting of:
   a first substrate implement having:
     a first side;
     a first groove contrivance machined, molded or casted into said first side;
     in which said first groove contrivance having a predetermined size and at least one of a proximate, square, circle, and rectangle pattern;

a first tracing tool having at least one of, a conductive pressure sensitive tracking tool, a conductive pressure sensitive digitizer pen, and a conductive pressure sensitive manual stylus, in which said first tracing tool further having:
  a first end portion, in which said first end portion having a tip with a first predetermined diameter size and shape;
  wherein said first predetermined diameter size and shape is configured to correspond to said first predetermined size of said first groove contrivance;
  wherein said tip of said first end portion is operable for tracing said first groove contrivance;
a second substrate implement, in which said second substrate implement having:
  a first surface;
  a second groove contrivance machined, molded or casted into said first surface; and
  wherein said second groove contrivance having a predetermined size and at least one of, a triangular and star-shape pattern;
a second tracing tool comprising at least one of, a conductive pressure sensitive tracking tool, a conductive pressure sensitive digitizer pen, and a conductive pressure sensitive manual stylus, in which said second tracing tool further having:
  a first end portion, in which said first end portion comprises a tip with a second predetermined diameter size and shape;
  wherein said second predetermined diameter size and shape is configured to correspond to said second predetermined size of said second groove contrivance; and
  wherein said tip of said first end portion is configured to trace said second groove contrivance;
a first touchpad, wherein said first touchpad is configured to sense an activity of said first tracing tool, in which said first touchpad is configured to record, save and display said sensed activity of said first tracing tool; and
a second touchpad, wherein said second touchpad is configured to sense an activity of said second tracing tool, in which said second touchpad is configured to record, save and display said sensed activity of said second tracing tool.

18. A system consisting of:
a first guiding mechanism, wherein said first guiding mechanism is configured to be operable for improving bimanual independence or coordination of a user, in which said first guiding mechanism having:
a first substrate implement characterized by;
  a first side;
  a second side opposite said first side;
  a first groove contrivance machined, molded or casted into said first side without going through said second side, in which said first groove contrivance comprises at least one of, a circle shape, an eight shape, a diamond shape, and a star-shape pattern;
and
a first tracing tool including:
  a first end portion, in which said first end portion comprises a tip that is configured to correspond to said first groove contrivance, wherein said tip of said first end portion is operable for tracing said first groove contrivance without going through said second side, with one hand of the user;

a second guiding mechanism, wherein said second guiding mechanism is configured to be operable for improving bimanual independence or coordination of the user, in which said second guiding mechanism having:
a second substrate implement, in which said second substrate implement characterized by;
  a first surface;
  a second surface opposite said first surface;
  a second groove contrivance machined, molded or casted into said first surface without going through said second surface;
  wherein said third groove contrivance comprises a first predetermined size and alphabetical shape or pattern;
a second tracing tool operable for tracing said second groove contrivance, in which said second tracing tool including:
  a first end portion, in which said first end portion comprises a tip with a predetermined diameter size and shape;
  wherein said predetermined diameter size and shape is configured to correspond to said second groove contrivance;
  wherein said tip of said first end portion is configured to be operable for following said third groove contrivance without going through said second surface, with other hand of the user.

19. A system comprising:
a first guiding mechanism, wherein said first guiding mechanism is configured to be operable for improving bimanual independence or coordination, in which said first guiding mechanism comprises:
a first substrate implement characterized by:
  a first side;
  a second side, wherein said second side is an opposite side of said first side;
  a first groove contrivance machined, molded or casted into said first side without going through said second side;
  in which said first groove contrivance comprises at least one of a proximate diamond and star-shape pattern;
  a second groove contrivance machined, molded or casted into said second side without going through said first groove contrivance, in which said second groove contrivance comprises at least one of a proximate circle and eight shape pattern;
a first tracing tool including:
  a first end portion, in which said first end portion comprises a tip with a first predetermined diameter size and shape;
  wherein said first predetermined diameter size and shape is configured to correspond to said first groove contrivance;
  wherein said tip of said first end portion is operable for tracing said first groove contrivance without said tip going through said second groove contrivance;
  a second end portion, in which said second end portion comprises a tip with a predetermined diameter size and shape corresponding to said second groove contrivance, and wherein said tip of said second end portion is operable for following said second groove contrivance without going through said first groove contrivance;
a second guiding mechanism, wherein said second guiding mechanism is configured to be operable for improving bimanual independence or coordination, in which said second guiding mechanism comprises:

a second substrate implement, in which said second substrate implement characterized by;

a first surface;

a second surface, said second surface disposed at an opposite side of said first surface;

a third groove contrivance machined, molded or casted into said first surface without going through said second surface;

wherein said third groove contrivance comprises alphabetical shape or patterns;

a fourth groove contrivance machined, molded or casted into said second surface without going through said first surface, in which said fourth groove contrivance comprises at least one of a proximate, square and triangular shape pattern;

a second tracing tool operable for tracing said second groove contrivance, in which said second tracing tool including:

a first end portion, in which said first end portion comprises a tip with a predetermined diameter size and shape;

wherein said predetermined diameter size and shape is configured to correspond to said third groove contrivance;

wherein said tip of said first end portion is configured to trace said third groove contrivance without said tip going through said fourth groove contrivance; and a second end portion, in which said second end portion is configured to correspond to said fourth groove contrivance, and wherein second end portion is operable for following said fourth groove contrivance without said second end portion going through said third groove contrivance.

20. The system of claim 19, in which said first and second substrate implements comprises interlocking notches, wherein said interlocking notches are configured to attach said first and second substrate implements.

* * * * *